United States Patent
Patten et al.

(10) Patent No.: US 7,597,008 B2
(45) Date of Patent: Oct. 6, 2009

(54) METHOD AND APPARATUS FOR DETERMINING FLOW PRESSURE USING DENSITY INFORMATION

(75) Inventors: Andrew T. Patten, Boulder, CO (US); Karl Benedict Stappert, Skiatook, OK (US)

(73) Assignee: Micro Motion, Inc., Boulder, CO (US)

( * ) Notice: Subject to any disclaimer, the term of this patent is extended or adjusted under 35 U.S.C. 154(b) by 67 days.

(21) Appl. No.: 11/720,262

(22) PCT Filed: Nov. 30, 2004

(86) PCT No.: PCT/US2004/039960
§ 371 (c)(1),
(2), (4) Date: May 25, 2007

(87) PCT Pub. No.: WO2006/059967
PCT Pub. Date: Jun. 8, 2006

(65) Prior Publication Data
US 2008/0034893 A1    Feb. 14, 2008

(51) Int. Cl.
*G01F 1/84* (2006.01)
*G01F 25/00* (2006.01)

(52) U.S. Cl. .............. 73/861.356; 73/861.18; 73/32 A

(58) Field of Classification Search ............. 73/32 A, 73/61.44, 61.45, 61.47, 61.49, 61.78, 61.79, 73/861.04, 861.08, 861.18, 861.355, 861.356, 73/861.357
See application file for complete search history.

(56) References Cited

U.S. PATENT DOCUMENTS

| | | | |
|---|---|---|---|
| 5,497,665 A | 3/1996 | Cate et al. | |
| 5,734,112 A | 3/1998 | Bose et al. | |
| 6,301,973 B1 * | 10/2001 | Smith | 73/861.357 |
| 6,502,466 B1 * | 1/2003 | Cage et al. | 73/861.355 |
| 6,857,324 B2 * | 2/2005 | Sato et al. | 73/861.61 |
| 6,865,957 B1 * | 3/2005 | Hughes et al. | 73/861.52 |
| 7,134,320 B2 * | 11/2006 | Gysling et al. | 73/32 A |
| 7,150,201 B2 * | 12/2006 | Tison et al. | 73/861 |

FOREIGN PATENT DOCUMENTS

JP    07 083721 A    3/1995

OTHER PUBLICATIONS

Van Wylen, John Wiley & Sons, Inc., "Fundamentals of Classical Thermodynamics," 1985, p. 381-385.

* cited by examiner

*Primary Examiner*—Helen C. Kwok
(74) *Attorney, Agent, or Firm*—The Ollila Law Group LLC

(57) ABSTRACT

A method and apparatus is disclosed that determines the density (602) of a material flowing through a Coriolis flow meter. The density is used to infer the pressure (608) of the flowing material. The inferred pressure may be used to correct for the secondary pressure effect in the Coriolis flow meter or may be reported to an external device.

16 Claims, 9 Drawing Sheets

| Compressibility @ 70 Deg F and Indicated Pressure ||||||||
|---|---|---|---|---|---|---|---|
| Pressure (psia) | Amarillo | Gulf Coast | Ekofisk | High CO2 N2 | High N2 | Methane | Air |
| 14 | 0.9980 | 0.9981 | 0.9976 | 0.9979 | 0.9983 | 0.9983 | 0.9997 |
| 64 | 0.9910 | 0.9913 | 0.9891 | 0.9906 | 0.9923 | 0.9920 | 0.9985 |
| 114 | 0.9839 | 0.9845 | 0.9806 | 0.9833 | 0.9863 | 0.9858 | 0.9974 |
| 164 | 0.9769 | 0.9778 | 0.9721 | 0.9760 | 0.9803 | 0.9797 | 0.9963 |
| 214 | 0.9698 | 0.9710 | 0.9636 | 0.9687 | 0.9744 | 0.9735 | 0.9953 |
| 264 | 0.9629 | 0.9643 | 0.9550 | 0.9615 | 0.9685 | 0.9674 | 0.9943 |
| 314 | 0.9559 | 0.9577 | 0.9465 | 0.9542 | 0.9626 | 0.9613 | 0.9934 |
| 364 | 0.9490 | 0.9510 | 0.9380 | 0.9470 | 0.9568 | 0.9552 | 0.9926 |
| 414 | 0.9421 | 0.9444 | 0.9295 | 0.9398 | 0.9511 | 0.9492 | 0.9918 |
| 464 | 0.9352 | 0.9378 | 0.9211 | 0.9327 | 0.9454 | 0.9433 | 0.9911 |
| 514 | 0.9284 | 0.9313 | 0.9127 | 0.9256 | 0.9398 | 0.9374 | 0.9904 |
| 564 | 0.9217 | 0.9249 | 0.9043 | 0.9186 | 0.9342 | 0.9315 | 0.9897 |
| 614 | 0.9150 | 0.9185 | 0.8959 | 0.9116 | 0.9287 | 0.9257 | 0.9892 |
| 664 | 0.9084 | 0.9121 | 0.8876 | 0.9046 | 0.9233 | 0.9200 | 0.9887 |
| 714 | 0.9018 | 0.9059 | 0.8794 | 0.8978 | 0.9180 | 0.9143 | 0.9882 |
| 764 | 0.8954 | 0.8997 | 0.8713 | 0.8910 | 0.9127 | 0.9087 | 0.9878 |
| 814 | 0.8890 | 0.8936 | 0.8632 | 0.8843 | 0.9075 | 0.9032 | 0.9875 |
| 864 | 0.8827 | 0.8876 | 0.8553 | 0.8777 | 0.9025 | 0.8978 | 0.9872 |
| 914 | 0.8765 | 0.8817 | 0.8474 | 0.8712 | 0.8975 | 0.8924 | 0.9870 |
| 964 | 0.8705 | 0.8758 | 0.8397 | 0.8649 | 0.8927 | 0.8872 | 0.9869 |
| 1014 | 0.8645 | 0.8702 | 0.8321 | 0.8586 | 0.8880 | 0.8821 | 0.9868 |
| 1064 | 0.8587 | 0.8646 | 0.8247 | 0.8525 | 0.8834 | 0.8771 | 0.9868 |
| 1114 | 0.8531 | 0.8591 | 0.8174 | 0.8465 | 0.8789 | 0.8722 | 0.9868 |
| 1164 | 0.8476 | 0.8538 | 0.8103 | 0.8407 | 0.8746 | 0.8674 | 0.9869 |
| 1214 | 0.8422 | 0.8487 | 0.8035 | 0.8350 | 0.8704 | 0.8627 | 0.9870 |
| 1264 | 0.8370 | 0.8437 | 0.7968 | 0.8295 | 0.8663 | 0.8583 | 0.9872 |
| 1314 | 0.8320 | 0.8389 | 0.7904 | 0.8241 | 0.8624 | 0.8539 | 0.9875 |
| 1364 | 0.8272 | 0.8342 | 0.7842 | 0.8190 | 0.8587 | 0.8497 | 0.9879 |
| 1414 | 0.8225 | 0.8297 | 0.7783 | 0.8141 | 0.8551 | 0.8457 | 0.9882 |
| 1464 | 0.8181 | 0.8254 | 0.7726 | 0.8093 | 0.8517 | 0.8418 | 0.9887 |

FIGURE 1

| Maximum Deviation % of Theoretically Linear Compressibility from Real Compressibility ||||||| 
|---|---|---|---|---|---|---|
| Amarillo | Gulf Coast | Ekofisk | High CO2 N2 | High N2 | Methane | Air |
| 1.1224 | 1.0450 | 1.2489 | 1.1063 | 1.0928 | 0.9819 | 0.6287 |

FIGURE 4

METHOD AND APPARATUS FOR DETERMINING FLOW PRESSURE USING DENSITY INFORMATION

BACKGROUND OF THE INVENTION

1. Field of the Invention

The invention is related to the field of flow meters, and in particular, to Coriolis flow meters.

2. Description of the Prior Art

Coriolis flow meters determine mass flow rates by sensing the Coriolis forces on a vibrating conduit. The conduit consists of one or more tubes and is forced to vibrate at a resonant frequency. The resonant frequency of the tube(s) is proportional to the density of the fluid in the flow tube(s). Sensors located on the inlet and outlet sections of the tube(s) measure the relative vibration between the ends of the tube(s). During flow, the vibrating tube(s) and the flowing mass couple together due to the Coriolis forces, causing a phase shift in the vibration between the ends of the tube(s). The phase shift is directly proportional to the mass flow.

There is a secondary pressure effect on the flow tube(s) of a Coriolis sensor. A change of pressure, without a change in mass flow rate, will change the effect of the bending forces on the tube. When the pressure increases, the flow tube(s) will stiffen and the same amount of Coriolis forces due to the constant mass flow rate will cause a smaller amount of bending in the tube(s). When the pressure decreases, the flow tube(s) will become more flexible and the same amount of Coriolis forces due to the constant mass flow rate will cause a larger amount of bending in the tube(s). The flow pressure effect is linear and is typically stated as a percent of the flow rate per unit change of pressure. Correcting for the pressure effect requires either using an average pressure value or measuring the actual pressure. Using an average pressure value can induce unacceptable errors when there are large variations in the operating pressure in the system. Measuring the actual pressure typically requires a pressure sensing port, a pressure transducer, electronic circuitry designed to monitor the pressure transducer, and some means for transferring the measured pressure to the Coriolis flow meter.

Therefore there is a need for a better system and method for determining the pressure in a Coriolis flow meter.

SUMMARY OF THE INVENTION

A method and apparatus is disclosed that determines the density of a material flowing through a Coriolis flow meter. The density is used to infer the pressure of the flowing material. The inferred pressure may be used to correct for the secondary pressure effect in the Coriolis flow meter or may be reported to an external device.

Aspects

One aspect of the invention includes, a method, comprising:

measuring the density of a material flowing through a Coriolis flow meter;

determining a pressure of the flowing material from the measured density.

Preferably, the method further comprises correcting a pressure effect in a mass flow rate measurement from the Coriolis flow meter using the determined flow pressure.

Preferably, the method further comprises:
(a) setting a value of compressibility z to 1 in the equation $$P = \frac{\rho * R * T * z}{M}$$

and calculating a value for the pressure P;
(b) using the calculated value of the pressure P to determine a more accurate value for the super-compressibility z;
(c) using the new more accurate value for the super-compressibility z to recalculate a value for the pressure P;
(d) repeating steps b and c until the value for the pressure has converged to within a predefined limit.

Preferably, the method further comprises where the compressibility is determined using information from the American Gas Association (AGA) report number 8.

Preferably, the method further comprises where the user is prompted to enter the mole weight (MW) of the material flowing through the flow meter.

Preferably, the method further comprises where the user is prompted to enter the gas type and the Coriolis flow meter determines the mole weight (MW) of the material flowing through the flow meter from the gas type.

Preferably, the method further comprises where the pressure is determined using the following formula:

$$P_{determined} = P_{low} + \left[\frac{(\rho_{current} - \rho_{low}) * (P_{high} - P_{low})}{\rho_{high} - \rho_{low}}\right].$$

Preferably, the method further comprises where the Coriolis flow meter has been calibrated at a high pressure point and a low pressure point for a plurality of materials.

Preferably, the method further comprises:
adjusting the pressure determined $P_{determined}$ for the current temperature.

Preferably the method further comprises:
calibrating the pressure to density relationship at two pressure point by correlating the determined pressure with a measured pressure at each of the two pressure points.

Preferably the method further comprises:
communicating the determined flow pressure to an external device.

Another aspect of the invention comprises:
(a) calibrating a density to pressure relationship of a Coriolis flow meter for a material at a low pressure point;
(b) calibrating the density to pressure relationship of the Coriolis flow meter for the material at a high pressure point;
(c) storing the two calibrated relationships for the material.

Preferably, the method further comprises where calibrating the density to pressure relationship comprises:
measuring the density of the material using the Coriolis flow meter while simultaneously measuring the pressure of the material in the Coriolis flow meter and correlating the two measurements.

Preferably, the method further comprises:
repeating steps (a) through (c) for a plurality of materials.

Preferably, the method further comprises:
determining a current pressure for the material based on a measured current density and the two stored calibration relationships.

Preferably, the method further comprises:
adjusting the current pressure for the material based on the current temperature of the material.

Preferably, the method further comprises where adjusting the current pressure for the material based on the temperature comprises the steps:
(a) determining the compressibility Z for the high and low pressure points;
(b) determine an average molar weight for the high and low pressure points;
(c) determine a "last pressure estimate"
(d) determine a new compressibility using the "last pressure estimate"
(e) calculate a "new pressure estimate"
(f) repeat steps (c)-(e) until the value for the "new pressure estimate" has converged to within a predefined limit Another aspect of the invention includes a Coriolis flow meter, comprising:
a conduit configured to contain a flowing material;
at least one driver configured to vibrate the conduit;
a first and a second sensor configured to measure the motion of the vibrating conduit;
a processor configured to determine a density of the flowing material based on the motion of the vibrating conduit;
the processor configured to determine a pressure of the flowing material based on the determined density.

Preferably, the method further comprises:
a storage area containing the pressure to density relationship for the flowing material at two different pressure points and where the pressure of the flowing material is determined using the density of the flowing material and the pressure to density relationship at the two pressure points.

Preferably, the method further comprises where the pressure of the flowing material is determined using an iterative method.

Preferably, the method further comprises where the iterative method iterates using a relationship between the pressure of the material, the density of the material, and a compressibility of the material.

Preferably, the method further comprises where the pressure of the flowing material is used to correct a pressure effect in the mass flow rate measured by the Coriolis flow meter.

Preferably, the method further comprises where the pressure of the flowing material is communicated to an external device.

Another Aspect of the invention includes a Coriolis flow meter, comprising:
a means for vibrating a conduit containing a flowing material;
a means for measuring the phase of the vibrating conduit;
a means for converting the measured phase into a flowing density measurement;
a means for determining the pressure of the flowing material based on the density.

BRIEF DESCRIPTION OF THE DRAWINGS

FIG. 1 is a table of gas compressibility for pressures varying between 14 psia and 1464 psia at a constant 70 degrees Fahrenheit for a number of different gases.

FIG. 4 is a table showing the maximum difference between a theoretically linear compressibility and the actual compressibility of a number of other gases over a pressure range between 14 psia and 1464 psia.

DETAILED DESCRIPTION OF THE PREFERRED EMBODIMENT

FIGS. 1-9 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 2:
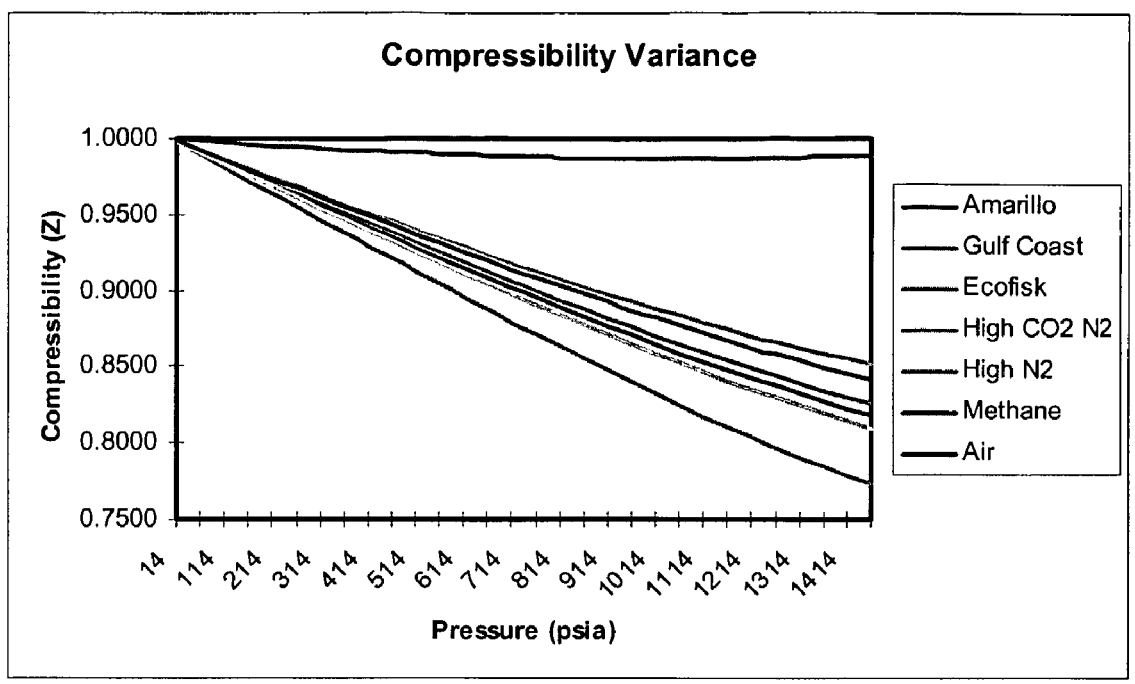
FIG. 2 is a graph showing the information from the table in FIG. 1.

Flowing density of a gas is expressed by the non-ideal gas law and is:

$$\rho = \frac{PM}{ZRT} \quad (1)$$

Where $\rho$ is the density of the flowing gas, P is the pressure of the flowing gas, M is the molar weight of the gas, Z is the compressibility of the gas, R is the gas constant, and T is the temperature of the flowing gas. In many cases the temperature and molar weight of the gas flowing through the Coriolis flow meter remain relatively constant. In cases where there is a wider range of flowing gas temperatures, the temperature of the flowing gas may be measured. When the flowing temperature and the molar weight are considered constants, equation 1 can be re-written as:

$$\rho = N\frac{P}{Z} \quad (2)$$

Where $\rho$ is the density of the flowing gas, P is the pressure of the flowing gas, N is a constant, and Z is the compressibility of the gas. Equation 2 shows that the variability of the flowing density is mainly affected by the flowing pressure and the compressibility. Equation 2 also shows that the flowing density is directly proportional to the flowing pressure, outside the effects of compressibility. The range of flowing pressure in the majority of gas measurement applications varies from atmospheric pressure (approximately 14 psia) to 1464 psia, a variance of approximately 105 to 1. FIG. 1 is a table of gas compressibility for pressures varying between 14 psia and 1464 psia at a constant 70 degrees Fahrenheit for a number of different gases. The compressibility of these gases is well know in the arts and one source for obtaining this information is American Gas Association (AGA) Report No. 8, "Compressibility Factor of Natural Gas and Related Hydrocarbon Gases" (Second printing 1994) which is hereby incorporated by reference. FIG. 2 is a chart showing the information from the table in FIG. 1. As can be seen from FIGS. 1 and 2, compressibility has a maximum variance of approximately 1.3 to 1, over the 14 to 1464 psia range.

Figure 3:
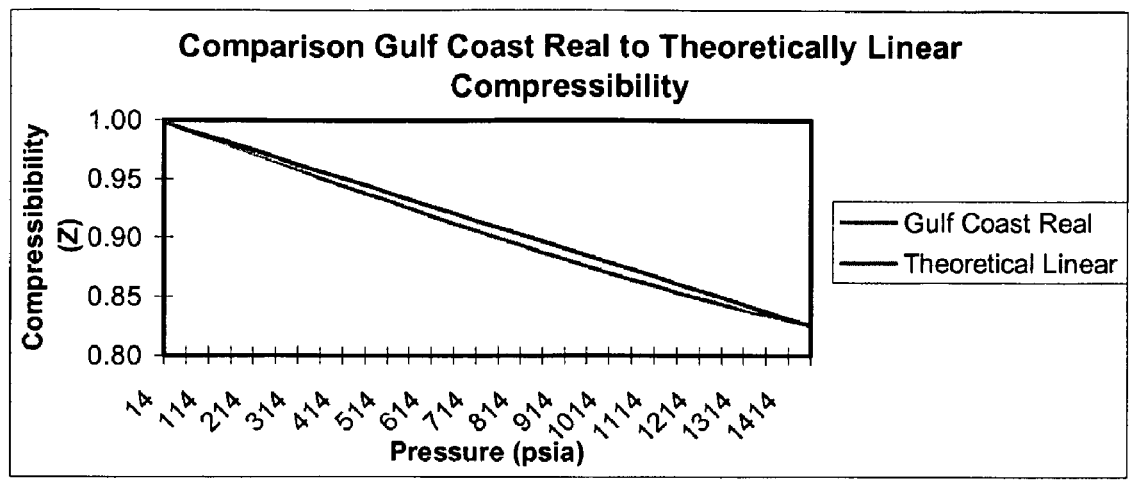
FIG. 3 is a graph showing the relationship between pressure and compressibility for a theoretically linear compressibility and the real compressibility of Gulf coast gas composition over a pressure range between 14 psia and 1464 psia.

FIG. 3 is a graph showing the relationship between pressure and compressibility for a theoretically linear compressibility and the real compressibility of Gulf coast gas composition over a pressure range between 14 psia and 1464 psia. As can be seen from FIG. 3, the difference between the theoretically linear variation and the actual variation between compressibility and pressure is slight for this gas composition. FIG. 4 is a table showing the maximum difference between a theoretically linear compressibility and the actual compressibility of a number of other gases. FIG. 4 indicates that there is a nearly linear relationship between compressibility and pressure for a wide range of gas compositions over the pressure range of 14 psia to 1464 psia. Equation 2 shows there is a linear relationship between pressure and density. Because of these linear and near linear relationships a correlative method can be used to equate flowing density to pressure.

Figure 5:
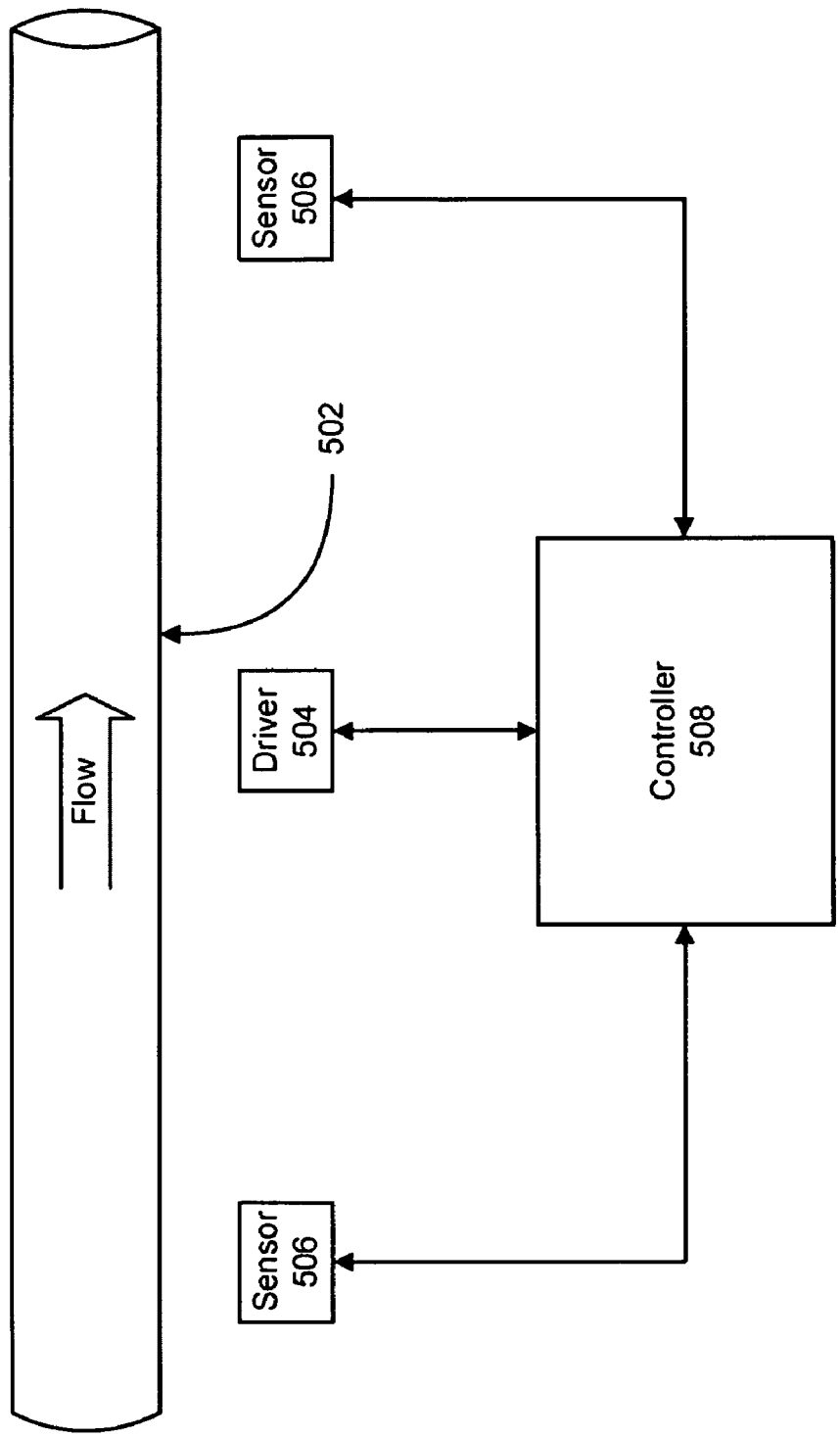
FIG. 5 is a block diagram of a Coriolis flow meter in an example embodiment of the current invention.

FIG. 5 is a block diagram of a Coriolis flow meter. The Coriolis flow meter has a conduit (502) with one or more tubes configured to contain a flowing material. There is one or more drivers (504) configured to vibrate the conduit at a natural bending frequency of the conduit. Sensors (506) are configured to measure the motion of the vibrating conduit (502). Controller (508) is connected to the driver(s) 504 and sensors 506 and configured to control the operations of the Coriolis flow meter. Controller (508) may be contained in one unit or may be split between multiple units. For example, there may be some electronics attached to the Coriolis flow meter and these electronics may be connected to an external computer running software that helps control the meter. In operation, the flowing material creates Coriolis forces in the vibrating conduit, causing a phase shift in the vibration between the two ends of the conduit. The sensors measure the phase shift between two positions on the conduit and the controller determines the flow rate of the material from the measured phase difference. The Coriolis flow meter may have a built in temperature probe (not shown), or may receive temperature data from an external sensor. Coriolis flow meters can also determine the density of the flowing material using the measured motion of the conduit.

Figure 6:
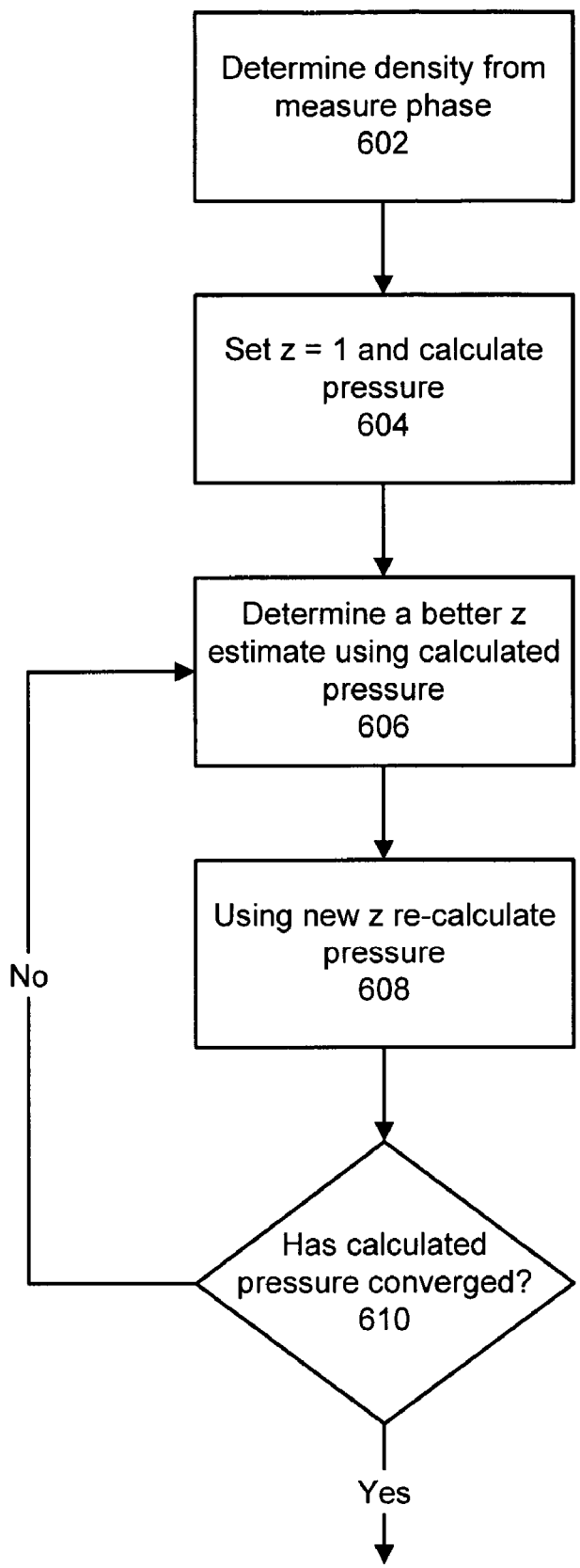
FIG. 6 is a flow chart for iteratively determining the flow pressure from the flowing density in one example embodiment of the current invention.

In one example embodiment of the current invention, the density of the flowing material is used to infer the flowing pressure of the material. FIG. 6 is a flow chart for iteratively determining the flow pressure from the flowing density. At step 602 the density of the material flowing through the Coriolis flow meter is determined using the measured motion of the vibrating conduit. Determining the density of the flowing material in a Coriolis flow meter is well known in the arts. At step 604 the compressibility of the gas z is set to 1 in the formula:

$$P = \frac{\rho * 1545 * T * z}{144 * M} \quad (3)$$

where P is the flowing pressure, T is the temperature, and M is the mole weight of the material flowing in the Coriolis flow meter, and a first pressure is calculated. At step 606 a better value of z is determined using the calculated pressure P. The value of the gas compressibility z at a given pressure P can be determined using the information in AGA report 8, compressibility look-up tables, compressibility equations of state, or the like. At step 608 the pressure is re-calculated using the new compressibility z. If the pressure value determined is step 608 has not converged to within a pre determined threshold, flow returns to step 606 where a better estimate of the gas compressibility is determined using the last calculated value for the pressure P. When the pressure value determined in step 608 has converged to within a pre determined threshold, the pressure has been successfully inferred from the flowing density. The inferred pressure can be used in a number of ways.

In one example embodiment of the invention, the pressure can be displayed or communicated to a device external to the Coriolis flow meter. For example, the pressure value could be sent to a safety device that monitors the pressure inside the pipe to detect unsafe pressure conditions. In another example embodiment of the current invention, the pressure value may be used to correct for a pressure effect in the mass flow measurement of the Coriolis flow meter. The pressure effect is typically stated as a percent of the flow rate per a unit change in pressure. One way to correct for the pressure effect is using equation 4:

$$M_{corrected} = \frac{M_{raw}}{1 + \left(\left(\frac{P_e}{100}\right) * (P_{static} - P_{cal})\right)} \quad (4)$$

Where $M_{corrected}$ is the corrected mass flow rate, $M_{raw}$ is the measured raw mass flow rate, $P_e$ is the pressure effect, $P_{static}$ is the current pressure, and $P_{cal}$ is the pressure the flow rate is currently calibrated at. $P_e$ is typically a function of the geometry of the Coriolis flow meter, for example the diameter of the conduit, the thickness of the conduit walls, the stiffness of the conduit, etc. Equation 4 shows that when the pressure in the meter is equal to the pressure the meter is calibrated at, the corrected flow is equal to the raw flow. When the current pressure is higher than the calibrated pressure, the corrected flow will be smaller than the measured flow.

When the Coriolis flow meter is inferring the flow pressure using the measured density, the molar weight and the temperature of the material flowing through the meter are needed. The temperature can be measured using a sensor in the meter, or may be provided from an external temperature sensor. The molar weight of the gas can be entered by a user or provided from a remote source. When a user is entering the molar weight for the material, they may enter it directly by typing in a value or they may enter it indirectly by identifying the flowing material by name or gas composition. When the user enters the name of the flowing material or the gas composition, the Coriolis flow meter may use a lookup table to determine the corresponding molar weight for the material.

Figure 7:
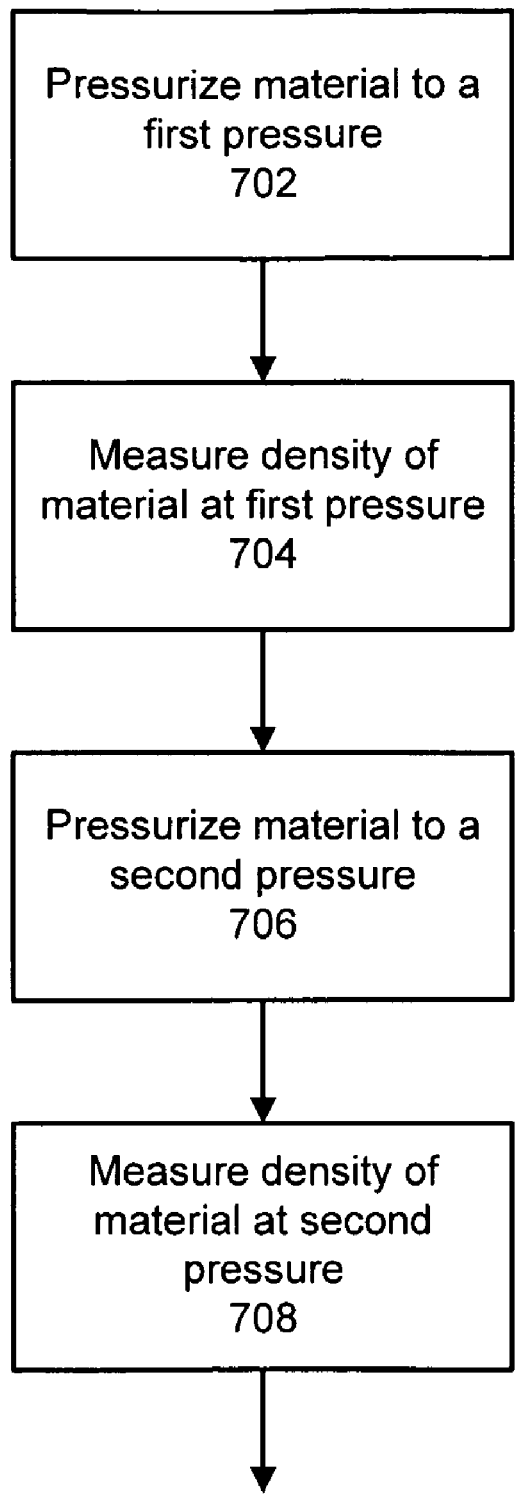
FIG. 7 is a flow chart showing a method of calibrating a flow meter at two pressure points in one example embodiment of the current invention.

In another example embodiment of the current invention, the measured density of a flowing material is used to determine the current pressure by using a calibrated pressure/density relationship at a high pressure point and at a low pressure point. Because the pressure/density relationship is nearly linear, once the flow meter has been calibrated at the two different pressure points, the pressure can be inferred from the current density without iteration. During the calibration process the pressure in the flow meter must be accurately measured. FIG. 7 is a flow chart showing a method of calibrating a flow meter at two pressure points. At step 702 the material in the flow meter is pressurized to a first level. At step 704 the density of the material is measured using the flow meter at the first pressure. At step 706 the material in the flow meter is pressurized to a second level. At step 708 the density of the material is measure at the second pressure. When calibrating the flow meter the material may be flowing through the meter or may be static inside the flow meter. The meter may be calibrated for each type of material flowing through the Coriolis flow meter. In one example embodiment of the invention, the high and low calibration points may be stored in a table for the different types of material that may be measured by the flow meter. When the material type currently flowing through the meter is entered into the flow meter, the meter would lookup the calibration points for that type of material.

Figure 8:
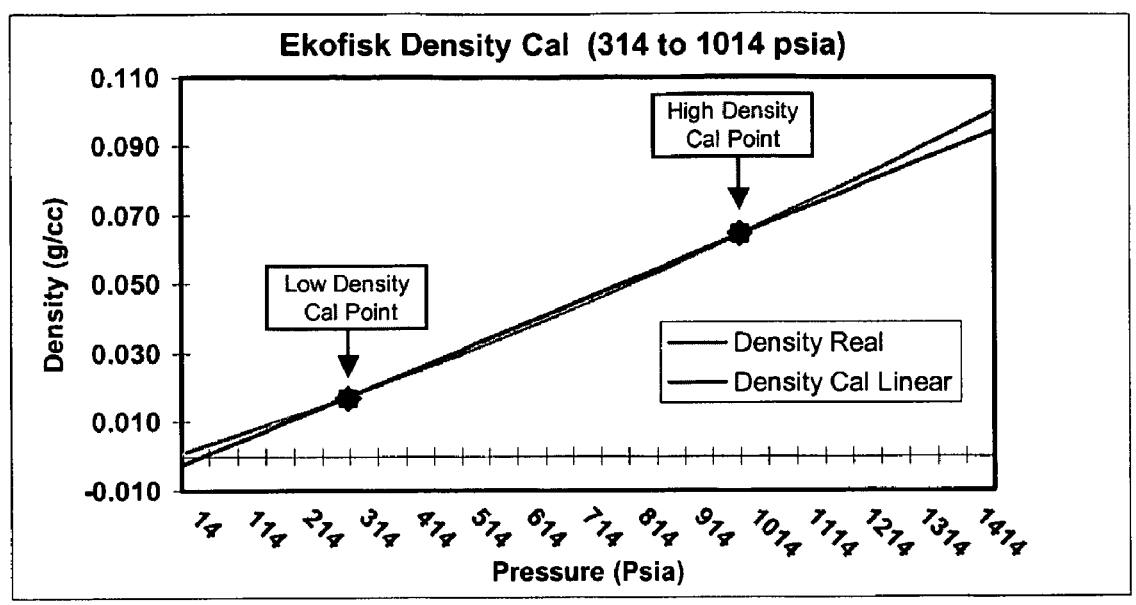
FIG. 8 is a chart showing the density/pressure relationship for Ekofish between 314 psia and 1014 psia.

Once a meter has been calibrated for a material, the pressure of the material can be determined from the density using equation number 5.

$$P_{determined} = P_{low} + \left[\frac{(\rho_{current} - \rho_{low})*(P_{high} - P_{low})}{\rho_{high} - \rho_{low}}\right] \quad (5)$$

Where $P_{determined}$ is the determined pressure, $P_{low}$ is the pressure at the low pressure calibration point, $P_{high}$ is the pressure at the high pressure calibration point, $\rho_{low}$ is the density measured at the low pressure calibration point, $\rho_{high}$ is the density measured at the high pressure calibration point, and $\rho_{current}$ is the current measured density of the material flowing through the meter. FIG. 8 is a chart showing the density/pressure relationship for Ekofish between 314 psia and 1014 psia. As can be seen from FIG. 8, the fit between the linear line and the actual curve is quite close.

Figure 9:
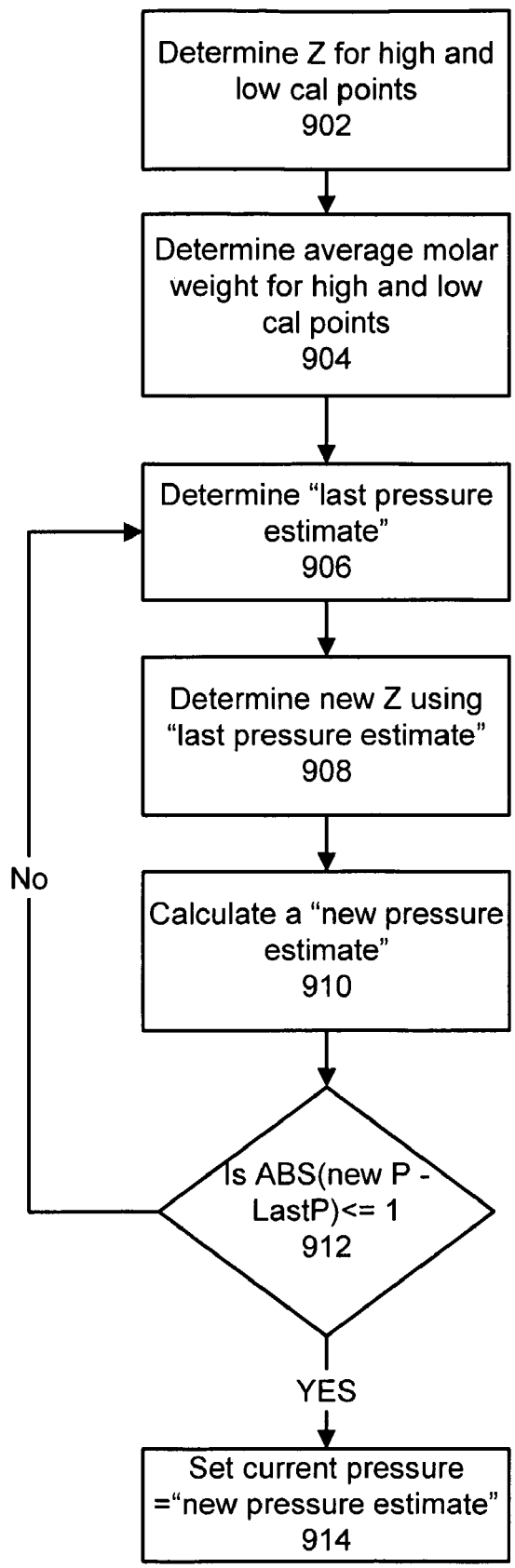
FIG. 9 is a flow chart for determining the current flowing pressure, adjusted for temperature, using the high and low pressure calibration points in one example embodiment of the invention.

In another example embodiment of the invention, the high and low pressure calibration information can be adjusted to take into account changes in temperature of the flowing material. FIG. 9 is a flow chart for determining the current flowing pressure, adjusted for temperature, using the high and low pressure calibration points. At step 902 compressibility is determined for each of the high and low pressure calibration points. The compressibility may be determined using any of the three methods (AGA gross Method 1, Method 2, or Detail Method) disclosed in AGA report number 8, compressibility look-up tables, compressibility equations of state, or the like. At step 904, an average molar weight for the high and low pressure calibration points is determined. Re-writing equation 1 to solve for the molar weight gives:

$$M = \frac{\rho Z R T}{P}. \quad (6)$$

Where M is the molar weight of the material, P is the measured pressure at the low and high pressure calibration points, Z is the compressibility determined in step 902, T is the temperature measure at the high and low calibration points, $\rho$ is the density measured at the high and low pressure calibration points, and R is a constant. The molar weight for the high pressure calibration point is averaged with the molar weight of the low pressure calibration point to give an average molar weight. At step 906 a current pressure P is determined using equation 5 and stored as the "last pressure estimate". At step 908 a new value for compressibility z is determined using the "last pressure estimate", the current temperature, the average molar weight of the material, and the current density. At step 910 a "new pressure estimate" is calculated with equation 3 using the compressibility determined in step 908, the average molar weight determined in step 904, the current density and the current temperature. At step 912 the "new pressure estimate" is evaluated using the following equation:

Absolute value("new pressure estimate"−"last pressure estimate")<=1. (7)

When the equation is true the "new pressure estimate" is set as the current pressure. When the equation is false the "new pressure estimate" is stored as the "last pressure estimate" and flow returns to step 906. Using this iterative method, the effects of a change in temperature in the flowing material can be taken into account when determining the pressure using the high and low pressure calibration points.

The invention claimed is:

1. A method, comprising:
   measuring a density of a material flowing through a Coriolis flow meter (602);
   determining a pressure of the flowing material from the measured density by following the steps of:
   (a) setting a value of compressibility z to 1 in the equation $$P = \frac{\rho * R * T * z}{M}$$

and calculating a value for a pressure P (604) where T is the temperature, M is a molar weight of the material flowing in the Coriolis flow meter, $\rho$ is the density, and R is a constant;
   (b) using the calculated value of the pressure P to determine a new more accurate value for the compressibility z (606);
   (c) using the new more accurate value for the compressibility z to recalculate a value for the pressure P (608);
   (d) repeating steps (b) and (c) until the value for the pressure has converged to within a predefined limit.

2. The method of claim 1 further comprising correcting a pressure effect in a mass flow rate measurement from the Coriolis flow meter using the determined flow pressure.

3. The method of claim 1 where the compressibility is determined using compressibility equations of state or compressibility look-up tables.

4. The method of claim 1 where a user is prompted to enter the molar weight (M) of the material flowing through the flow meter.

5. The method of claim 1 where a user is prompted to enter a gas type and the Coriolis flow meter determines the molar weight (M) of the material flowing through the flow meter from the gas type.

6. The method of claim 1 further comprising communicating the determined flow pressure to an external device.

7. A method, comprising:
   (a) calibrating a density to pressure relationship of a Coriolis flow meter for a material at a low pressure point;
   (b) calibrating a density to pressure relationship of the Coriolis flow meter for the material at a high pressure point;
   (c) storing the two calibrated relationships for the material;
   (d) determining a current pressure for the material based on a measured current density and the two stored calibration relationships;
   (e) determining a compressibility Z for the high and low pressure points (902);
   (f) determining an average molar weight for the high and low pressure points;

(g) calculating a value for the current pressure;
(h) determining a new compressibility using the calculated value for the current pressure;
(i) using the new compressibility to recalculate a new value for the current pressure; and
(j) repeating steps (g)-(i) until the value for the pressure has converged to within a predetermined limit.

8. The method of claim 7 where calibrating the density to pressure relationship for the material at the low and high pressure points comprises:
measuring the density of the material using the Coriolis flow meter while simultaneously measuring the pressure of the material in the Coriolis flow meter and correlating the two measurements.

9. The method of claim 7 further comprising:
repeating steps (a) through (c) for a plurality of materials.

10. A Coriolis flow meter configured to execute the method of claim 7, comprising:
a conduit configured to contain a flowing material (502);
at least one driver configured to vibrate the conduit (504);
a first and a second sensor (506) configured to measure a motion of the vibrating conduit;
a processor configured to determine a density of the flowing material based on the motion of the vibrating conduit (508);
the processor configured to determine a pressure of the flowing material based on the determined density by executing steps (a)-(d).

11. The Coriolis flow meter of claim 10 further comprising:
a storage area containing a pressure to density relationship for the flowing material at two different pressure points and where the pressure of the flowing material is determined using the density of the flowing material and the pressure to density relationship at the two pressure points.

12. The Coriolis flow meter of claim 10 where the pressure of the flowing material is determined using an iterative method.

13. The Coriolis flow meter of claim 12 where the iterative method iterates using a relationship between the pressure of the material, the density of the material, and a compressibility of the material.

14. The Coriolis flow meter of claim 10 where the pressure of the flowing material is used to correct a pressure effect in a mass flow rate measured by the Coriolis flow meter.

15. The Coriolis flow meter of claim 10 where the pressure of the flowing material is communicated to an external device.

16. A Coriolis flow meter configured to execute the method of claim 1, comprising:
a conduit configured to contain a flowing material;
at least one driver configured to vibrate the conduit;
a first and a second sensor configured to measure a motion of the vibrating conduit;
a processor configured to determine a density of the flowing material based on the motion of the vibrating conduit;
the processor configured to determine a pressure of the flowing material based on the determined density by executing steps (a)-(d).

* * * * *